(12) United States Patent
Fujii (10) Patent No.: US 7,920,782 B2
(45) Date of Patent: Apr. 5, 2011

(54) IMAGING DEVICE

(75) Inventor: Shinichi Fujii, Osaka (JP)

(73) Assignee: Sony Corporation, Tokyo (JP)

( * ) Notice: Subject to any disclaimer, the term of this patent is extended or adjusted under 35 U.S.C. 154(b) by 83 days.

(21) Appl. No.: 12/210,589

(22) Filed: Sep. 15, 2008

(65) Prior Publication Data

US 2009/0110383 A1 Apr. 30, 2009

(30) Foreign Application Priority Data

Oct. 29, 2007 (JP) ................................ P2007-280239

(51) Int. Cl.
*G03B 3/00* (2006.01)
*G03B 13/18* (2006.01)

(52) U.S. Cl. .......................... 396/128; 396/89; 396/114

(58) Field of Classification Search ................. 396/89, 396/114, 128
See application file for complete search history.

(56) References Cited

U.S. PATENT DOCUMENTS

| 2007/0154200 A1* | 7/2007 | Utagawa et al. | 396/111 |
| 2007/0206940 A1* | 9/2007 | Kusaka | 396/128 |
| 2007/0253692 A1* | 11/2007 | Terada | 396/89 |
| 2007/0292126 A1* | 12/2007 | Oshima | 396/429 |
| 2008/0118238 A1 | 5/2008 | Sogawa et al. | |
| 2008/0170152 A1 | 7/2008 | Fujii | |
| 2008/0259202 A1 | 10/2008 | Fujii | |

FOREIGN PATENT DOCUMENTS

JP 8-43914 2/1996

OTHER PUBLICATIONS

U.S. Appl. No. 12/277,412, filed Nov. 25, 2008, Fujii, et al.
U.S. Appl. No. 11/908,324, filed Sep. 11, 2007, Fujii et al.
U.S. Appl. No. 12/197,662, filed Aug. 25, 2008, Ono, et al.
U.S. Appl. No. 12/210,560, filed Sep. 15, 2008, Fujii.
U.S. Appl. No. 12/240,203, filed Sep. 29, 2008, Fujii.

* cited by examiner

*Primary Examiner* — W. B. Perkey
*Assistant Examiner* — Dennis Hancock
(74) *Attorney, Agent, or Firm* — Oblon, Spivak, McClelland, Maier & Neustadt, L.L.P.

(57) ABSTRACT

An imaging device having a shooting optical system, including an imaging element having a pixel array capable of generating image signals regarding light from a subject coming through the shooting optical system, and a focus-detection pixel line having pairs of pixels, the pixels of each of the pairs receiving luminous fluxes from the subject coming through a pair of individually corresponding partial regions of an exit pupil of the shooting optical system; a rapid-fire shooting unit configured to perform rapid-fire shooting to generate image signals at the pixel array on each exposure and to generate certain signals at the focus-detection pixel line; a focus detection unit configured to perform focus detection by a phase-difference detection method on the basis of the certain signals; and a focus adjustment unit configured to perform focus adjustment during each interval of the exposures on the basis of a result of focus detection.

9 Claims, 10 Drawing Sheets

IMAGING DEVICE

CROSS REFERENCES TO RELATED APPLICATIONS

The present invention contains subject matter related to Japanese Patent Application JP 2007-280239 filed in the Japanese Patent Office on Oct. 29, 2007, the entire contents of which are incorporated herein by reference.

BACKGROUND OF THE INVENTION

1. Field of the Invention

The present invention relates to an imaging device having a shooting optical system.

2. Description of the Related Art

In a single-reflex camera (imaging device), a mirror unit including a main mirror and a submirror that can be driven are provided, and when the mirror unit is moved down, light from a subject coming through a shooting lens is guided to a phase-difference-detection AF module (phase-difference AF module) and an optical finder, and when the mirror unit is moved up, light from the subject is guided to an imaging surface.

In rapid-fire shooting by such a camera, the mirror unit is driven to move down and move up during each interval of exposures of the imaging surface so that light from a subject is guided to the AF module. Thus, phase-difference AF can be performed by using the AF module (e.g., see Japanese Unexamined Patent Application Publication No. 8-43914).

SUMMARY OF THE INVENTION

However, in phase-difference AF during rapid-fire shooting according to Japanese Unexamined Patent Application Publication No. 8-43914, since the mirror unit is driven to perform exposure in the AF module, rapid-fire shooting at a high rate is inhibited by the time taken for this operation. This will be described with reference to FIG. 15.

Figure 15:
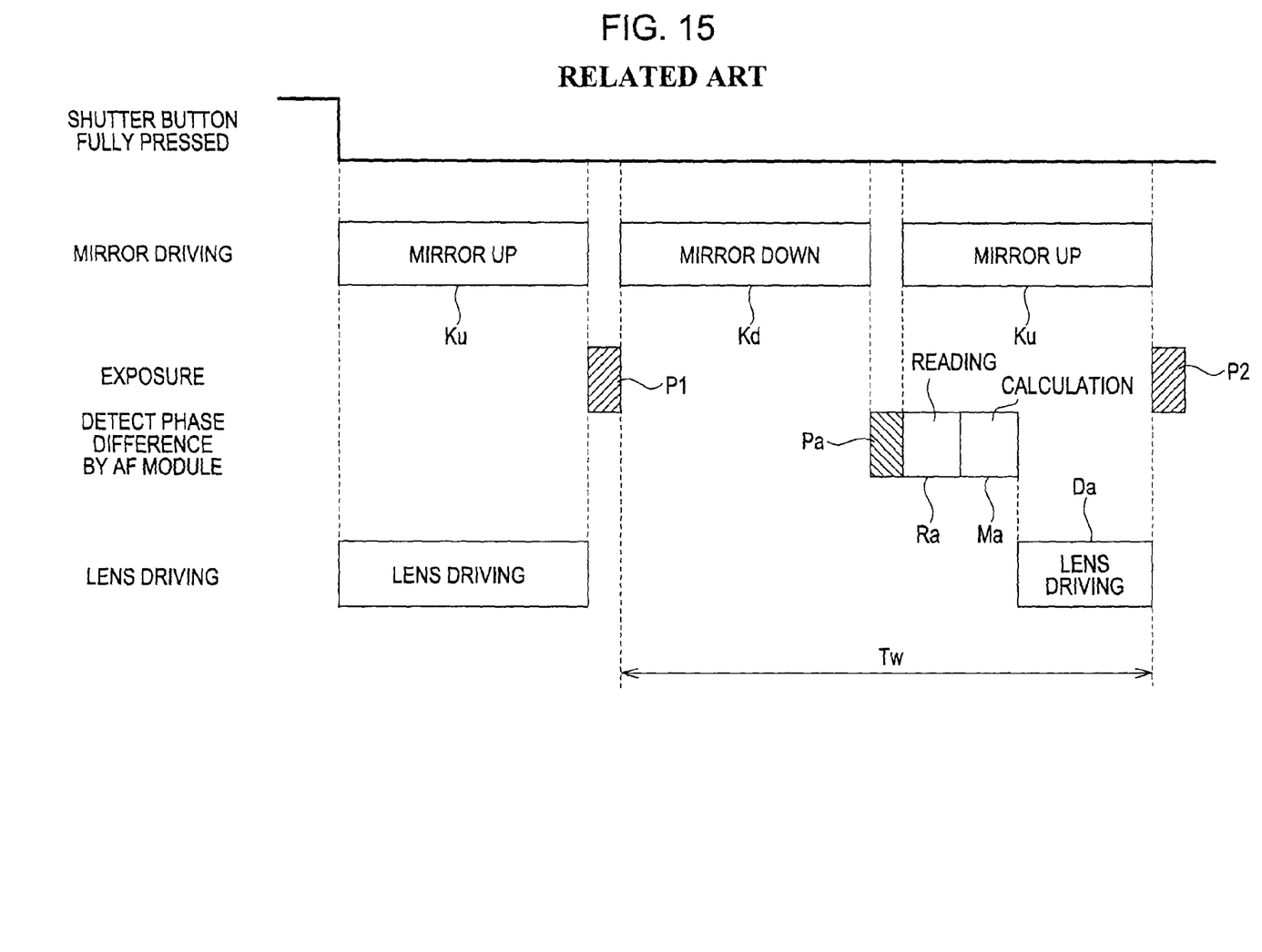
FIG. 15 is a time chart for explaining an AF operation in rapid-fire shooting according to the related art.

FIG. 15 is a time chart for explaining an AF operation in rapid-fire shooting according to the related art.

When a shutter button is full-pressed to start rapid-fire shooting, after an exposure (main exposure) P1 of an imaging surface, light from a subject is guided to the AF module by performing mirror-down driving Kd, and an exposure Pa for phase-difference detection is performed. After the exposure Pa, mirror-up driving Ku is performed, and reading Ra of exposure data from the AF module and a calculation process Ma for phase-difference AF are performed, and lens driving Da to an in-focus position is performed. In such operations during rapid-fire shooting, even if it is attempted to reduce a time interval Tw between the first time of main exposure P1 and the second time of main exposure P2, it is not possible to make the time interval Tw shorter than a total time taken for the mirror-down driving Kd, the mirror-up driving Ku, and the exposure Pa of the AF module. This inhibits increasing the rate of rapid-fire shooting.

There exists a demand for an imaging device that is capable of performing rapid-fire shooting at a high rate even in a case where phase-difference AF is performed during rapid-fire shooting.

According to an embodiment of the present invention, there is provided an imaging device having a shooting optical system, the imaging device including (a) an imaging element having a pixel array capable of generating image signals regarding light from a subject coming through the shooting optical system, and a focus-detection pixel line having two or more pairs of pixels arrayed along a predetermined direction, the pixels of each of the pairs receiving luminous fluxes from the subject coming through a pair of individually corresponding partial regions of an exit pupil of the shooting optical system; (b) rapid-fire shooting means for performing rapid-fire shooting by successively exposing the imaging element to generate the image signals at the pixel array on occasion of each exposure and to generate certain signals at the focus-detection pixel line; (c) focus detection means for performing focus detection by a phase-difference detection method on the basis of the certain signals generated by the exposure; and (d) focus adjustment means for performing focus adjustment during each interval of the exposures on the basis of a result of detection by the focus detection means.

According to the embodiment, during rapid-fire shooting performed by successively exposing an imaging element having two or more pairs of pixels arrayed along a predetermined direction, the pixels of each of the pairs receiving luminous fluxes from a subject coming through a pair of individually corresponding partial regions of an exit pupil of the shooting optical system, focus detection by a phase-difference detection method is performed on the basis of certain signals generated by the focus-detection pixel line on each occasion of exposure, and focus adjustment is performed during each interval of exposure. Accordingly, rapid-fire shooting at a high rate can be performed even in a case where phase-difference AF is performed during rapid-fire shooting.

DESCRIPTION OF THE PREFERRED EMBODIMENTS

External Configuration of an Imaging Device

Figure 1:
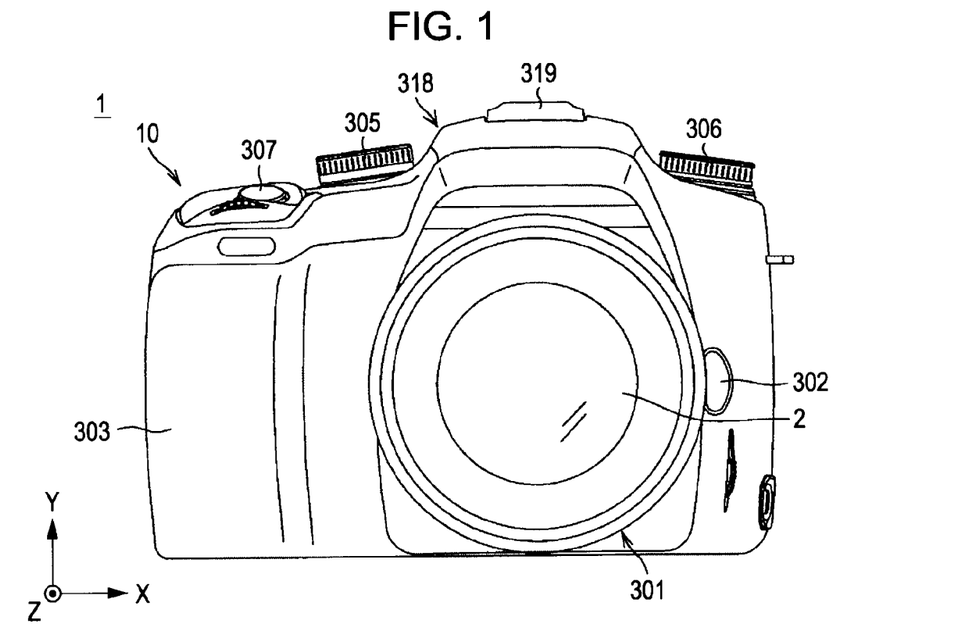
FIG. 1 is an illustration showing the external configuration of an imaging device according to an embodiment of the present invention.
Figure 2:
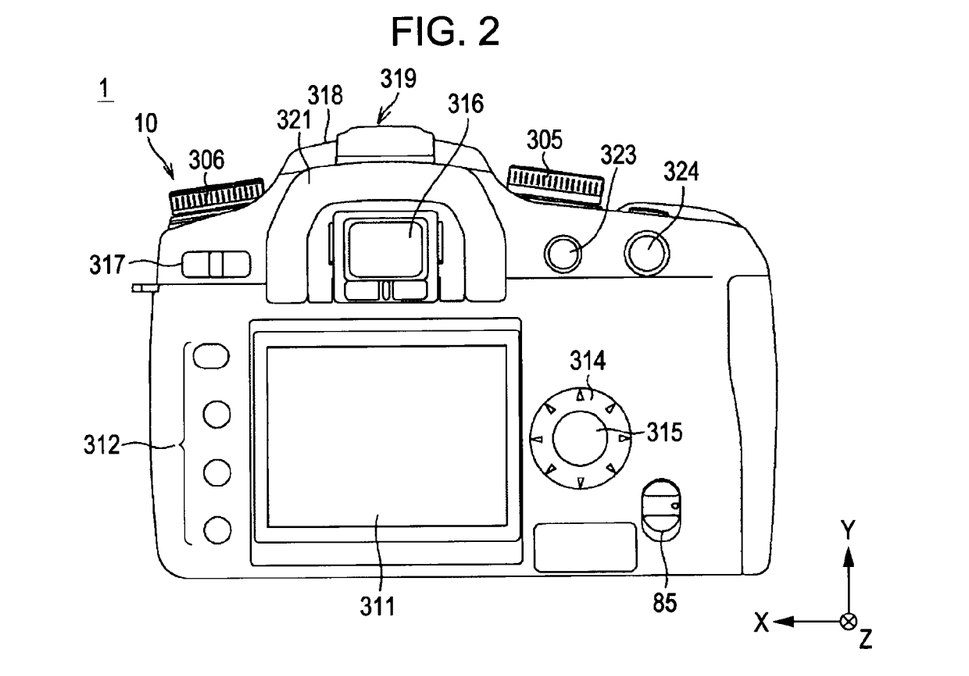
FIG. 2 is an illustration showing the external configuration of the imaging device.

FIGS. 1 and 2 are illustrations showing the external configuration of an imaging device 1 according to an embodiment of the present invention, where FIG. 1 shows a front view and FIG. 2 shows a rear view.

The imaging device 1 is configured as a single-lens reflex digital still camera. The imaging device 1 includes a camera body 10, and an exchange lens 2 as an imaging lens can be mounted on or dismounted from the camera body 10.

Referring to FIG. 1, provided on the front side of the camera body 10 are a mounting part 301 where the exchange lens 2 is mounted, provided substantially at the center of the front side, a lens exchange button 302 provided on the right side of the mounting part 301, a grip part 303 that allows a user to hold the imaging device 1, a mode setting dial 305 provided in an upper left part on the front side, a control-value setting dial 306 provided in an upper right part on the front side, and a shutter button 307 provided on an upper surface of the grip part 303.

Referring next to FIG. 2, provided on the rear side of the camera body 10 are a liquid crystal display (LCD) 311, setting buttons 312 provided on the left side of the LCD 311, a cross-shaped key 314 provided on the right side of the LCD 311, and a push button 315 provided at the center of the cross-shaped key 314. Provided further on the rear side of the camera body 10 are an optical finder 316 provided on the upper side of the LCD 311, an eyecup 321 surrounding the optical finder 316, a main switch 317 provided on the left side of the optical finder 316, an exposure correction button 323 and an auto exposure (AE) lock button 324 provided on the right side of the optical finder 316, and a flash unit 318 and a connection terminal part 319 provided on the upper side of the optical finder 316.

In the mounting part 301, a connector Ec (see FIG. 5) for forming an electrical connection with the exchange lens 2 mounted, and a coupler 75 (see FIG. 5) for forming a mechanical coupling with the exchange lens 2 mounted are provided.

The lens exchange button 302 is pressed when dismounting the exchange lens 2 mounted on the mounting part 301.

The grip part 303 is a part that allows a user to hold the imaging device 1 when the user shoots a picture. For the purpose of enhanced fitting, the grip part 303 has an undulated surface in accordance with the shapes of fingers. Inside the grip part 303, a battery containing room and a card containing room (not shown) are provided. The battery containing room contains a battery 69B (see FIG. 5) as a camera power source, and the card containing room contains a memory card 67 (see FIG. 5) for recording image data of shot pictures thereon, in such a manner that the memory card 67 is removable. The grip part 303 may have a grip sensor for detecting whether the grip part 303 is held by a user.

The mode setting dial 305 and the control-value setting dial 306 are formed of substantially disk-shaped parts that can rotate in a plane substantially parallel to the upper surface of the camera body 10. The mode setting dial 305 is used to select one of the modes or functions of the imaging device 1, for example, an auto exposure (AE) control mode, an auto focus (AF) control mode, various types of shooting modes such as a still-picture shooting mode for shooting a single still picture or a moving-picture shooting mode, or a reproduction mode for reproducing a recorded picture. The control-value setting dial 306 is used to set control values for various functions of the imaging device 1.

The shutter button 307 is a press switch with which two types of operations can be performed, namely, an operation for a "half-pressed state", in which the shutter button 307 is pressed to an intermediate position, and an operation for a "full-pressed state", in which the shutter button 307 is further pressed to a deeper position. In the still-picture shooting mode, when the shutter button 307 is half-pressed, preparatory operations for shooting a still picture of a subject (such as setting of an exposure control value and focus detection) are performed. Furthermore, when the shutter button 307 is full-pressed, a shooting operation (a series of operations for exposing an imaging element 101 (see FIG. 3), performing predetermined image processing on image signals acquired by the exposure, and recording the result on a memory card or the like) is performed. When the shutter button 307 is kept full-pressed, the imaging device 1 enters a rapid-fire shooting mode, in which rapid-fire shooting is performed to shoot still pictures successively.

The LCD 311 has a color liquid crystal panel capable of displaying pictures. For example, the LCD 311 displays a picture acquired by the imaging element 101 (see FIG. 3), reproduces and displays a picture that has been recorded, and so forth. Furthermore, the LCD 311 displays a screen for setting of functions or modes of the imaging device 1. Instead of the LCD 311, an organic EL display or a plasma display may be used.

The setting buttons 312 are used to perform operations relating to various functions of the imaging device 1. The setting buttons include, for example, a selection determining switch and a selection cancelling switch for determining and cancelling selection on a menu screen displayed on the LCD 311, a menu view switch for switching of content displayed on the menu screen, a view on/off switch, a view enlarging switch, and so forth.

The cross-shaped key 314 has a circular-shaped part having a plurality of pressing parts (parts indicated by triangular marks in the figure) arranged circumferentially at regular intervals. The cross-shaped key 314 is configured so that pressing operations of the pressing parts can be detected by contact points (switches) (not shown) provided in association with the individual pressing parts. The push button 315 is provided at the center of the cross-shaped key 314. The cross-shaped key 314 and the push button 315 are used to change the magnification factor for shooting (movement of a zoom lens 212 (see FIG. 5) in the wide-angle direction or the telephoto direction), perform frame forwarding of recorded pictures played on the LCD 311 or the like, and enter instructions for setting of shooting conditions (aperture value, shutter speed, whether to perform flashing, etc.) or the like.

The optical finder 316 optically displays a range of shooting of a subject. That is, an image of a subject is guided from the exchange lens 2 to the optical finder 316, so that by looking into the optical finder 316, a user can view an image of the subject that is actually acquired by the imaging element 101.

The main switch 317 is implemented by a two-contact-point slide switch that can slide leftward and rightward. The imaging device 1 is powered on when the main switch 317 is set to the left side, and the imaging device 1 is powered off when the main switch 317 is set to the right side.

The flash unit 318 is configured as a pop-up built-in flash. In a case where an external flash unit or the like is attached to the camera body 10, the connection terminal part 319 is used for connection.

The eyecup 321 is a U-shaped shielding part that inhibits external light from entering the optical finder 316.

The exposure correction button 323 is used to manually adjust an exposure value (aperture value or shutter speed). The AE lock button 324 is used to keep exposure fixed.

The exchange lens 2 functions as a lens window through which light (optical image) from a subject is captured, and also functions as a shooting optical system for guiding the light from the subject to the imaging element 101 provided inside the camera body 10. The exchange lens 2 can be removed from the camera body 10 by pressing the lens exchange button 302 described earlier.

Figure 5:
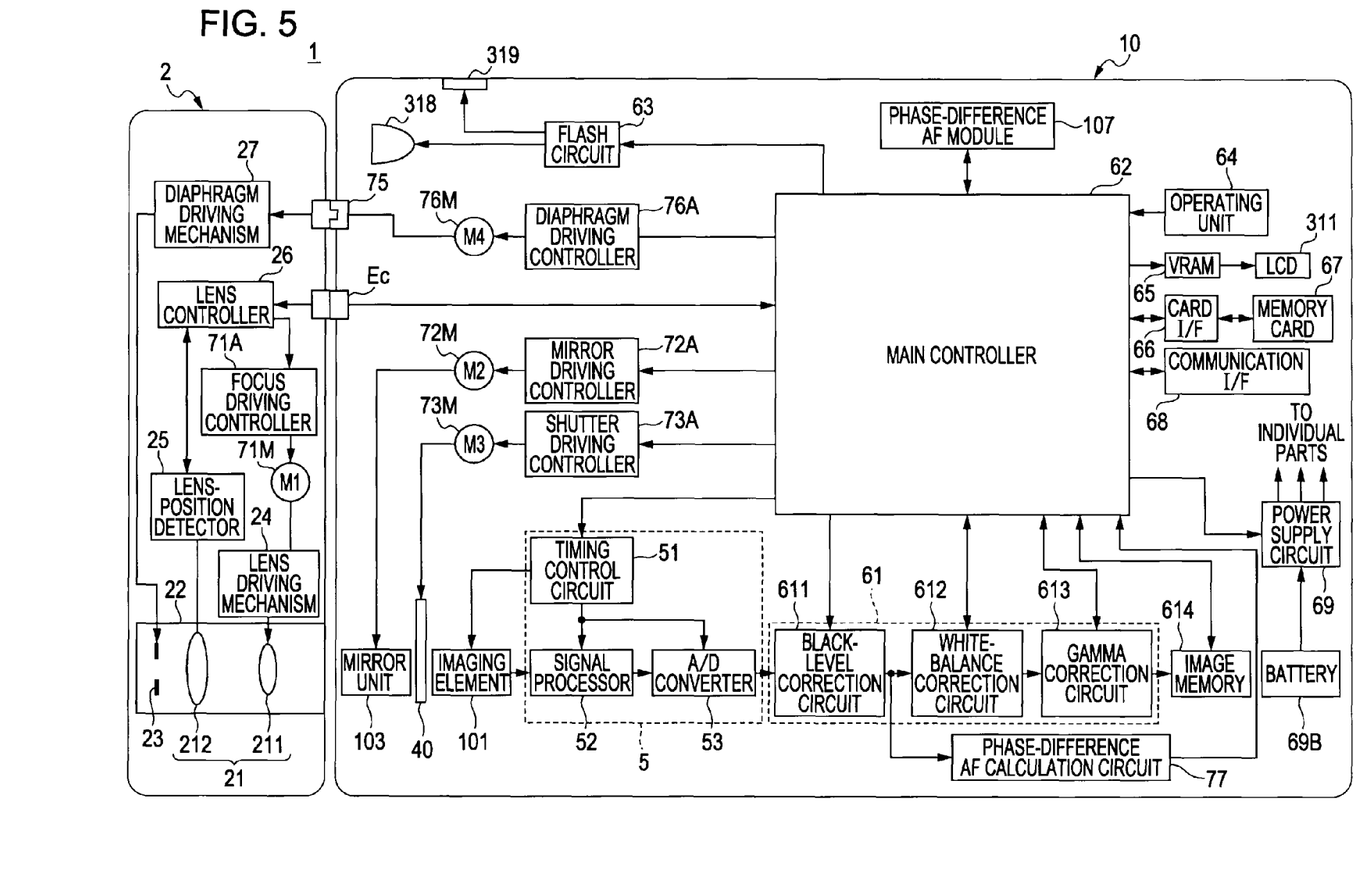
FIG. 5 is a block diagram showing the electrical configuration of the imaging device.

The exchange lens 2 includes a lens set 21 including a plurality of lenses arrayed in series along an optical axis LT (see FIG. 5). The lens set 21 includes a focus lens 211 (see FIG. 5) for adjusting the focus, and a zoom lens 212 (see FIG. 5) for changing the magnification factor. The focus can be adjusted and the magnification factor can be changed by driving the focus lens 211 and the zoom lens 212 in the direction of the optical axis LT (see FIG. 3), respectively. Furthermore, at an appropriate part around the barrel of the exchange lens 2, an operation ring that can be rotated along the peripheral surface of the barrel is provided. The zoom lens 212 is moved in the direction of the optical axis LT in accordance with the direction and amount of rotation of the operation ring by a manual operation or an automatic operation, and a zoom factor (magnification factor for shooting) corresponding to the position after the movement is set.

Internal Configuration of the Imaging Device 1

Figure 3:
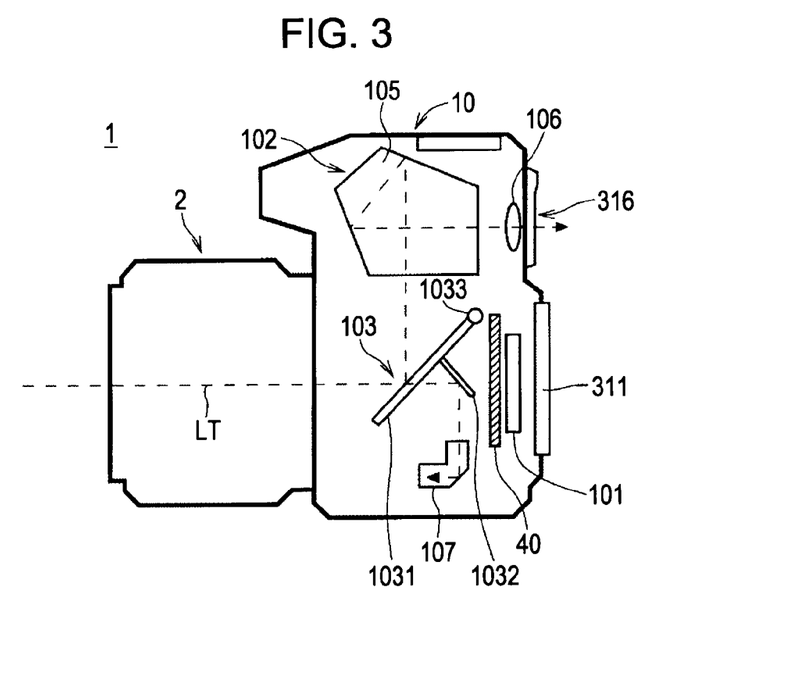
FIG. 3 is a vertical sectional view of the imaging device.

Next, the internal configuration of the imaging device 1 will be described. FIG. 3 is a vertical sectional view of the imaging device 1. As shown in FIG. 3, inside the camera body 10, an imaging element 101, a finder unit 102 (finder optical system), a mirror unit 103, a phase-difference AF module 107, and so forth are provided.

The imaging element 101 is disposed in a direction that is perpendicular to the optical axis LT of the lens set 21 of the exchange lens 2 when the exchange lens 2 is mounted on the camera body 10. As the imaging element 101, for example, a CMOS color area sensor (CMOS imaging element) with a two-dimensional matrix of pixels individually having photodiodes is used. The imaging element 101 generates analog electric signals (image signals) of individual color components of red (R), green (G), and blue (B) regarding an optical image of a subject, formed through the exchange lens 2, and outputs the analog electric signals as image signals of the individual R, G, and B color components. The configuration of the imaging element 101 will be described later in detail.

On the optical axis LT, the mirror unit 103 is disposed at a position where the light from the subject is reflected toward the finder unit 102. The light from the subject coming through the exchange lens 2 is reflected upward by the mirror unit 103 (a main mirror 1031 described later). Part of the light from the subject coming through the exchange lens 2 transmits through the mirror unit 103.

The finder unit 102 includes a pentaprism 105, an eyeglass 106, and the optical finder 316. The pentaprism 105 is a prism that has a pentagonal section and that inverts an optical image of a subject entering from a bottom face thereof in a top-to-bottom and left-to-right fashion by internal reflection to form an upright image. The eyeglass 106 guides the subject image inverted into an upright image by the pentaprism 105 to the outside of the optical finder 316. With the configuration described above, the finder unit 102 functions as a finder for checking the field of view for shooting when the user is waiting before an actual shooting operation.

The mirror unit 103 includes a main mirror 1031 and a submirror 1032. On the rear side of the main mirror 1031, the submirror 1032 is provided so that the submirror 1032 can rotate so as to fall toward the rear surface of the main mirror 1031. The part of the light from the subject having transmitted through the main mirror 1031 is reflected by the submirror 1032, and the reflected light enters the phase-difference AF module 107.

Figure 4:
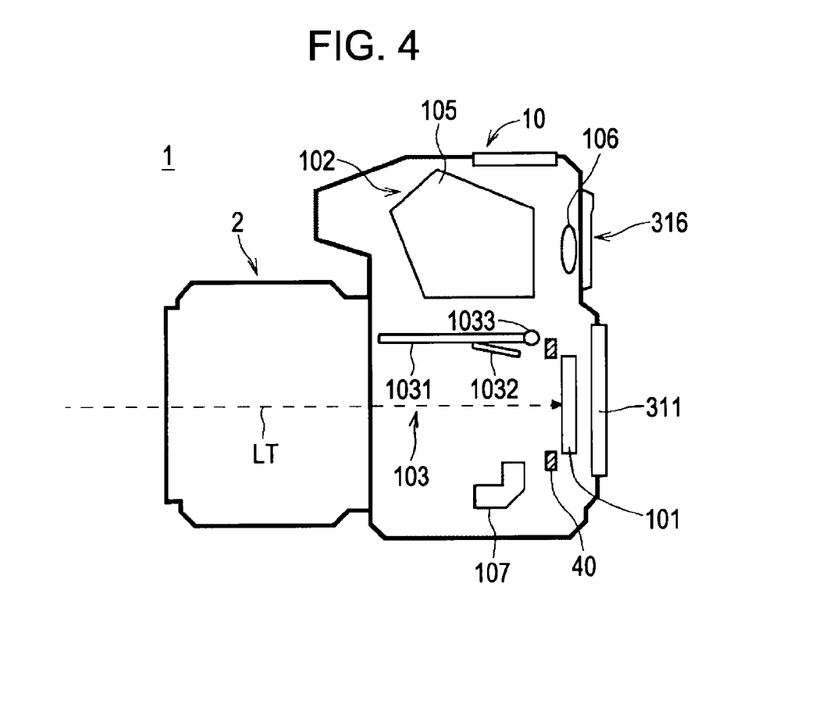
FIG. 4 is an illustration showing a mirror-up state of a mirror unit.

The mirror unit 103 described above is configured as what is called a quick return mirror. That is, the mirror unit 103 performs switching between an optical path (first optical path) through which the light from the subject coming through the exchange lens 2 is guided to the phase-difference AF module 107, as shown in FIG. 3, and an optical path (second optical path) through which the light is guided to the imaging element 101, as shown in FIG. 4. More specifically, at the time of exposure (actual shooting), the mirror unit 103 is rotated upward about a rotation axis 1033. At this time, when the mirror unit 103 is stopped at a position under the pentaprism 105, the submirror 1032 is withdrawn so that the submirror 1032 becomes substantially parallel to the main mirror 1031. Thus, the light from the subject coming through the exchange lens 2 reaches the imaging element 101 without being blocked by the mirror unit 103, whereby the imaging element 101 is exposed. Upon completion of an imaging operation by the imaging element 101, the mirror unit 103 is returned to the original position (the position shown in FIG. 3) so that the light from the subject coming through the exchange lens 2 is guided to the phase-difference AF module 107.

Furthermore, by placing the mirror unit 103 in the mirror-up state shown in FIG. 4 prior to actual shooting (shooting for image recording), the imaging device 1 can perform live-view (preview) display to display an image of a subject on the LCD 311 like a moving picture on the basis of image signals sequentially generated by the imaging element 101. That is, in the imaging device 1 before actual shooting, it is possible to determine a composition for shooting a picture of a subject by selecting either an electronic finder for the live view display (live view mode) or an optical finder. The switching between the electronic finder and the optical finder can be performed by operating a changeover switch 85 shown in FIG. 2.

The phase-difference AF module 107 is what is called an AF sensor implemented, for example, by a macrometer sensor that detects focus information of a subject. The phase-difference AF module 107 is disposed under the mirror unit 103. The phase-difference AF module 107 detects an in-focus position by phase-difference focus detection (hereinafter referred to as "phase-difference AF"). That is, when the user checks a subject through the optical finder 316 while waiting for a shooting operation, light from the subject is guided to the phase-difference AF module 107 with the main mirror 1031 and the submirror 1032 moved down as shown in FIG. 3, and the focus lens 211 in the exchange lens 2 is driven for focus adjustment on the basis of an output from the phase-difference AF module 107.

In front of the imaging element 101 in the direction of the optical axis LT, a shutter unit 40 is provided. The shutter unit 40 includes a screen that moves up and down. The shutter unit 40 is configured as a mechanical focal plane shutter that opens or blocks the optical path of light coming from the subject and guided to the imaging element 101 along the optical axis LT by opening or closing the screen. The shutter unit 40 can be omitted in a case where the imaging element 101 is an imaging element with a fully electronic shutter.

Electrical Configuration of the Imaging Device 1

FIG. 5 is a block diagram showing the electrical configuration of the imaging device 1. In FIG. 5, parts corresponding to those shown in FIGS. 1 to 4 are designated by the same numerals. For convenience of description, the electrical configuration of the exchange lens 2 will first be described.

The exchange lens 2 includes, in addition to the lens set 21 described earlier, a lens driving mechanism 24, a lens position detector 25, a lens controller 26, and a diaphragm driving mechanism 27.

In the lens set 21, the focus lens 211, the zoom lens 212, and a diaphragm 23 for adjusting the amount of light that reaches the imaging element 101 in the camera body 10 are arranged along the optical axis LT (FIG. 3) in a barrel 22 so that an optical image of a subject is captured and formed on the imaging element 101. In AF control, an AF actuator 71M in the exchange lens 2 drives the focus lens 211 along the direction of the optical axis LT to adjust the focus.

A focus driving controller 71A generates a driving control signal for the AF actuator 71M, used to move the focus lens 211 to an in-focus position, on the basis of an AF control signal supplied from a main controller 62 via the lens controller 26. The AF actuator 71M is implemented by a stepping motor or the like. The AF actuator 71M applies a lens driving force to the lens driving mechanism 24.

The lens driving mechanism 24 is implemented, for example, by a helicoid and a gear (not shown) that rotates the helicoid. The lens driving mechanism 24 receives a driving force from the AF actuator 71M and drives the focus lens 211 and so forth in a direction parallel to the optical axis LT. The direction and amount of movement of the focus lens 211 correspond to the direction of rotation and the number of revolutions of the AF actuator 71M.

The lens position detector 25 includes, within the range of possible movement of the lens set 21, an encoding plate having a plurality of code patterns formed at a predetermined pitch along the direction of the optical axis LT, and an encoder brush that moves together with the lenses in sliding contact with the encoding plate. The lens position detector 25 detects the amount of movement for adjustment of the focus of the lens set 21. The lens position detected by the lens position detector 25 is output in the form of, for example, the number of pulses.

The lens controller 26 is implemented, for example, by a microcomputer including memories such as a ROM storing a control program and a flash memory storing data regarding status information.

Furthermore, the lens controller 26 has a communication function for performing communication with the main controller 62 of the camera body 10 via the connector Ec. Thus, the lens controller 26 can send to the main controller 62, for example, status information data regarding the lens set 21, such as the focal length, exit pupil position, aperture value, in-focus distance, and amount of ambient light, and position information of the focus lens 211 detected by the lens position detector 25. Furthermore, the lens controller 26 can receive from the main controller 62, for example, data of the amount of driving of the focus lens 211.

The diaphragm driving mechanism 27 receives a driving force from a diaphragm driving actuator 76M via the coupler 75 and changes the aperture diameter of the diaphragm 23.

Next, the electrical configuration of the camera body 10 will be described. In addition to the imaging element 101, the shutter unit 40, and so forth described earlier, the camera body 10 includes an analog front end (AFE) 5, an image processor 61, an image memory 614, a main controller 62, a flash circuit 63, an operating unit 64, a VRAM 65, a card I/F 66, a memory card 67, a communication I/F 68, a power supply circuit 69, a battery 69B, a mirror driving controller 72A, a mirror driving actuator 72M, a shutter driving controller 73A, a shutter driving actuator 73M, a diaphragm driving controller 76A, and a diaphragm driving actuator 76M.

As described earlier, the imaging element 101 is implemented by a CMOS color area sensor. The start and end of an exposure of the imaging element 101, and imaging operations such as selection for output from the individual pixels of the imaging element 101 and reading of pixel signals are controlled by a timing control circuit 51, which will be described later.

The AFE 5 supplies timing pulses to the imaging element 101 so that the imaging element 101 performs predetermined operations. Furthermore, the AFE 5 performs predetermined signal processing on image signals output from the imaging element 101, converts the image signals into digital signals, and outputs the digital signals to the image processor 61. The AFE 5 includes a timing control circuit 51, a signal processor 52, an A/D converter 53, and so forth.

The timing control circuit 51 generates predetermined timing pulses (pulses for generating vertical scanning pulses, horizontal scanning pulses, a reset signal, and so forth) on the basis of a reference clock signal output from the main controller 62, and outputs the timing pulses to the imaging element 101 to control imaging operations by the imaging element 101. Furthermore, the timing control circuit 51 controls the operations of the signal processor 52 and the A/D converter 53 by outputting predetermined timing pulses individually to the signal processor 52 and the A/D converter 53.

The signal processor 52 performs predetermined analog signal processing on analog image signals output from the imaging element 101. The signal processor 52 includes a correlated double sampling (CDS) circuit, an automatic gain control (AGC) circuit, a clamp circuit, and so forth. The A/D converter 53 converts analog R, G, and B image signals output from the signal processor 52 into digital image signals composed of a plurality of bits (e.g., 12 bits) on the basis of timing pulses output from the timing control circuit 51.

The image processor 61 creates an image file by performing predetermined signal processing on image data output from the AFE 5. The image processor 61 includes a black-level correction circuit 611, a white balance correction circuit 612, a gamma correction circuit 613, and so forth. Image data input to the image processor 61 is temporarily written to the image memory 614 in synchronization with reading from the imaging element 101. Then, the image data written to the image memory 614 is accessed when processing is executed in the individual blocks of the image processor 61.

The black-level correction circuit 611 corrects the black level of the R, G, and B digital image signals obtained through A/D conversion by the A/D converter 53 to a reference black level.

The white-balance correction circuit 612 performs level conversion (white balance (WB) adjustment) of digital signals of the red (R), green (G), and blue (B) color components on the basis of a reference of white in accordance with a light source. That is, on the basis of WB adjustment data supplied from the main controller 62, the white-balance correction circuit 612 identifies a portion estimated as corresponding to a white region of a subject according to luminance or chrominance data and so forth, obtains individual averages of the R, G, and B components and a G/R ratio and a G/B ratio of the portion, and performs level correction using these ratios as R and B correction gains.

The gamma correction circuit 613 corrects tone characteristics of image data that has undergone the white balance adjustment. More specifically, the gamma correction circuit 613 performs non-linear conversion and offset adjustment of the levels of image data using gamma correction tables defined for the individual color components.

The image memory 614, when in the shooting mode, temporarily stores image data output from the image processor 61, and is used as a work area for the main controller 62 to execute predetermined processing on the image data. When in the reproducing mode, the image memory 614 temporarily stores image data read from the memory card 67.

The main controller 62 is implemented, for example, by a microcomputer including memories such as a ROM that stores a control program and a PAM that temporarily stores data. The main controller 62 controls the operations of the individual parts of the imaging device 1.

The flash circuit 63, in a flash shooting mode, controls the amount of light emitted by the flash unit 318 or an external flash unit connected to the connection terminal part 319 to an amount set by the main controller 62.

The operating unit 64 includes the mode setting dial 305, the control-value setting dial 306, the shutter button 307, the setting buttons 312, the cross-shaped key 314, the push button 315, the main switch 317, and so forth. The operating unit 64 is used to input operation information to the main controller 62.

The VPAM 65 has a capacity for storing image signals corresponding to the number of pixels of the LCD 311. The VRAM 65 is a buffer memory provided between the main controller 62 and the LCD 311. The card I/F 66 is an interface that enables exchange of signals between the memory card 67 and the main controller 62. The memory card 67 is a recording medium for saving image data generated by the main controller 62. The communication I/F 68 is an interface that enables transmission of image data and the like to a personal computer or other external devices.

The power supply circuit 69 is implemented, for example, by a constant voltage circuit or the like. The power supply circuit 69 generates voltages for driving the entire imaging device 1, such as the main controller 62, the imaging element 101, and various driving units. The application of electricity to the imaging element 101 is controlled according to a control signal supplied from the main controller 62 to the power supply circuit 69. The battery 69B is a primary battery such as an alkaline battery or a secondary battery such as a nickel metal hydride battery. The battery 69B is a power source that supplies electric power to the entire imaging device 1.

The mirror driving controller 72A generates a driving signal for driving the mirror driving actuator 72M in synchronization with timing of a shooting operation. The mirror driving actuator 72M is an actuator that rotates the mirror unit 103 (quick return mirror) to a horizontal position or a tilted position.

The shutter driving controller 73A generates a driving control signal for the shutter driving actuator 73M on the basis of a control signal supplied from the main controller 62. The shutter driving actuator 73M is an actuator that performs driving for opening and closing the shutter unit 40 (opening and closing operations).

The diaphragm driving controller 76A generates a driving control signal for the diaphragm driving actuator 76M on the basis of a control signal supplied from the main controller 62. The diaphragm driving actuator 76M applies a driving force to the diaphragm driving mechanism 27 via the coupler 75.

Furthermore, the camera body 10 includes a phase-difference AF calculation circuit 77. The phase-difference AF calculation circuit 77 performs calculation relating to auto focus (AF) control performed by using the imaging element 101, on the basis of image data that has undergone black level correction, output from the black-level correction circuit 611.

A phase-difference AF operation of the imaging device 1 performed by using the phase-difference AF calculation circuit 77 will be described in detail.

Phase-Difference AF Operation of the Imaging Device 1

The imaging device 1 is configured so that it is possible to perform phase-difference AF by receiving at the imaging element 101 light having transmitted (passed) through different parts of the exit pupil. The configuration of the imaging element 101 and the principle of phase-difference AF performed by using the imaging element 101 will be described below.

Figure 6:
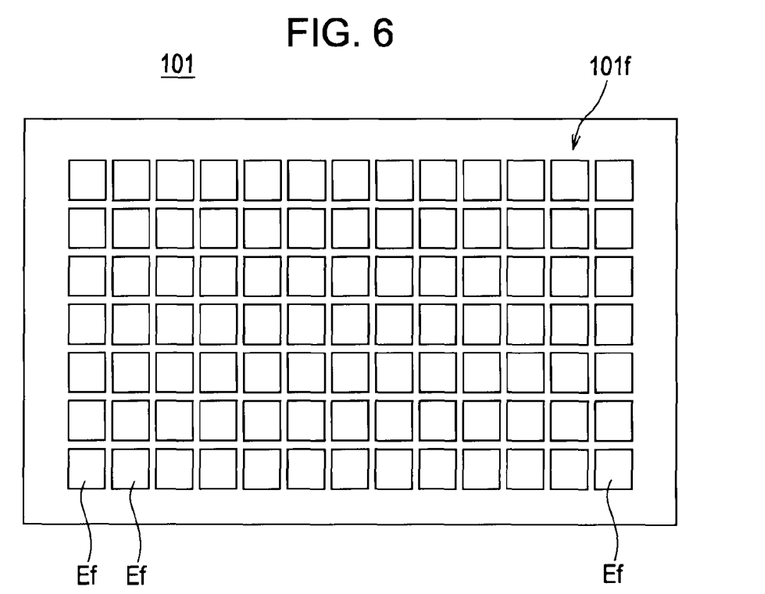
FIG. 6 is a diagram for explaining the configuration of an imaging element.
Figure 7:
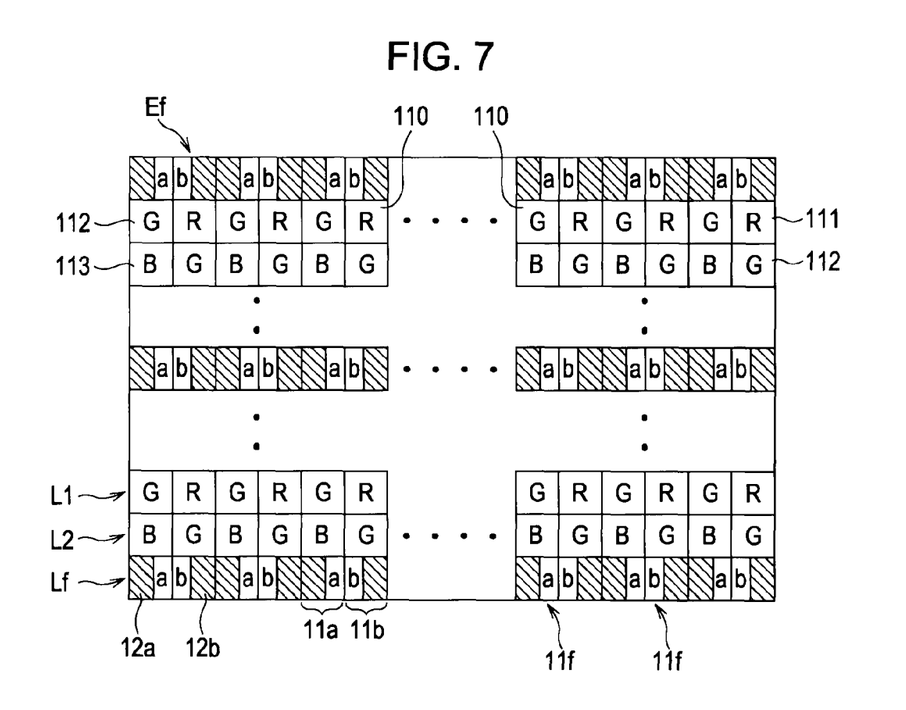
FIG. 7 is a diagram for explaining the configuration of the imaging element.

FIGS. 6 and 7 are diagrams for explaining the configuration of the imaging element 101.

The imaging element 101 is configured so that focus detection based on phase difference detection can be performed in each of a plurality of AF areas Ef defined in a matrix form on an imaging surface 101f of the imaging element 101 (FIG. 6).

In each of the AF areas Ef, ordinary pixels 110 including R pixels 111, G pixels 112, and B pixels 113 having red (R), green (G), and blue (B) color filters on photodiodes (hereinafter simply referred to as "ordinary pixels") are provided, and pixels 11f for performing phase-difference AF (hereinafter referred to as "AF pixels") having shield plates 12a and 12b (shown as hatched) are provided (FIG. 7).

Furthermore, in the AF area Ef, as horizontal lines of the ordinary pixels 110, Gr lines L1, on which G pixels 112 and R pixels 111 are arranged alternately in the horizontal direction, and Gb lines L2, on which B pixels 113 and G pixels 112 are arranged alternately in the horizontal direction, are formed. The Gr lines L1 and Gb lines L2 are arranged alternately in the vertical direction to form a Bayer-pattern pixel array. Thus, image signals relating to an optical image of a subject, coming through the exchange lens 2, can be generated.

Furthermore, in the AF area Ef, for example, for each set of six horizontal lines of the ordinary pixels 110, an AF line (focus-detection pixel line) Lf, on which the AF pixels 11f are arranged in the horizontal direction, is formed. In the AF area Ef, for example, about 20 AF lines Lf are provided.

Figure 8:
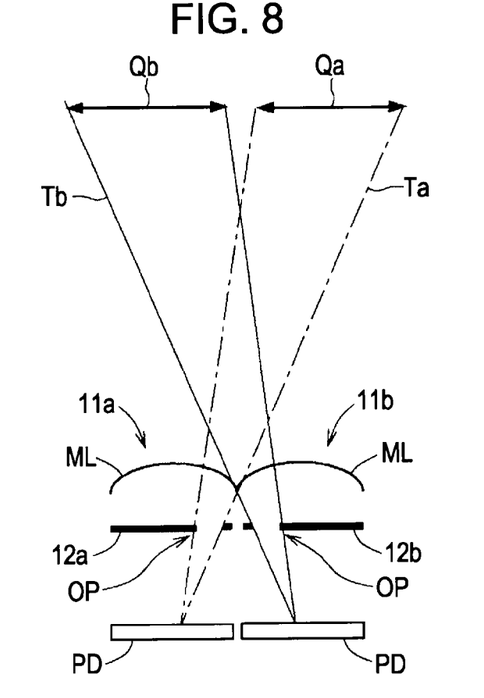
FIG. 8 is a diagram for explaining the principle of phase-difference AF performed by using AF lines.

Next, the principle of phase-difference AF performed by using the AF lines Lf will be described in detail.

FIG. 8 is a diagram for explaining the principle of phase-difference AF performed by using the AF lines Lf.

On each AF line Lf, two or more pairs of a pixel 11a and a pixel 11b are arrayed along the horizontal direction. The pixels 11a and 11b have shield plates 12a and 12b, respectively, with openings OP provided at mirror-symmetric positions. The shield plates 12a and 12b with the openings OP separate a luminous flux Ta coming from a right part Qa and a luminous flux Tb coming from a left part Qb of the exit pupil of the exchange lens 2. More specifically, referring to FIG. 7, on each AF line Lf, pixels 11a (hereinafter also referred to as "first AF pixels") and pixels 11b (hereinafter also referred to as "second AF pixels") are arranged alternately. Each of the pixels 11a has a shield plate 12a with a slit-shaped opening OP deviated rightward from with reference to a photoelectric converter (photodiode) PD thereunder (FIG. 7). On the other hand, each of the pixels 11b has a shield plate 12b with a slit-shaped opening OP deviated leftward with respect to a photoelectric converter PD thereunder. Thus, the luminous flux Ta coming from the right part Qa of the exit pupil passes through a microlens ML and the opening OP of the shield plate 12a and is received by the photoelectric converter PD of the first AF pixel 11a, and a luminous flux Tb coming from the left part Qb of the exit pupil passes through a microlens ML and the opening OP of the shield plate 12b and is received by the photoelectric converter PD of the second AF pixel 11b. That is, the paired pixels 11a and 11b receive the luminous flux Ta and the luminous flux Tb coming from a subject, having passed through the right part and the left part (a pair of partial regions) Qa and Qb of the exit pupil of the exchange lens 2, respectively.

Hereinafter, outputs from the first AF pixels 11a will be referred to as "a-series pixel outputs", and outputs from the second AF pixels 11b will be referred to as "b-series pixel outputs". An example of relationship between a-series pixel outputs and b-series pixel outputs obtained from a pixel array of AF pixels 11f located on one AF line Lf will be described with reference to FIGS. 9 and 10.

Figure 9:
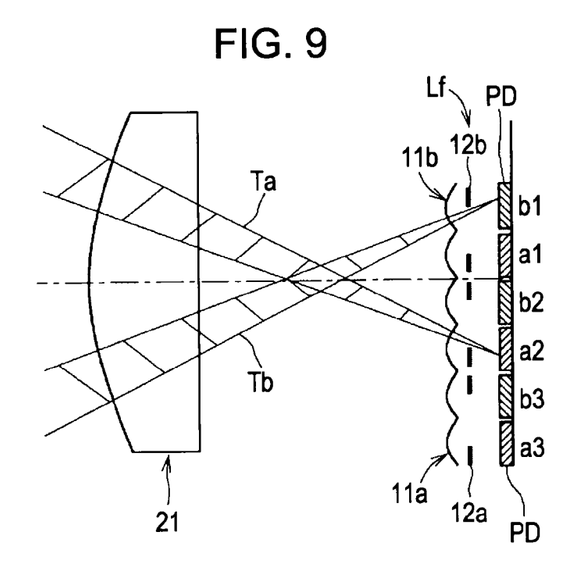
FIG. 9 is a diagram for explaining relationship between a-series pixel outputs and b-series pixel outputs.

On the AF line Lf, for example, as shown in FIG. 9, the luminous flux Ta and the luminous flux Tb from either side of the exit pupil are received by the first AF pixels 11a and the second AF pixels 11b, respectively. The a-series pixel outputs of the AF line including a-series pixels a1 to a3 arranged as shown in FIG. 9 can be represented as a graph Ga (indicated by a solid line Ga) in FIG. 10. On the other hand, the b-series pixel outputs of the AF line Lf including b-series pixels b1 to b3 arranged as shown in FIG. 9 can be represented as a graph Gb (indicated by a broken line) in FIG. 10. That is, a pair of image lines Ga and Gb represented by the graphs Ga and Gb are generated by the a-series and b-series pixel outputs.

Figure 10:
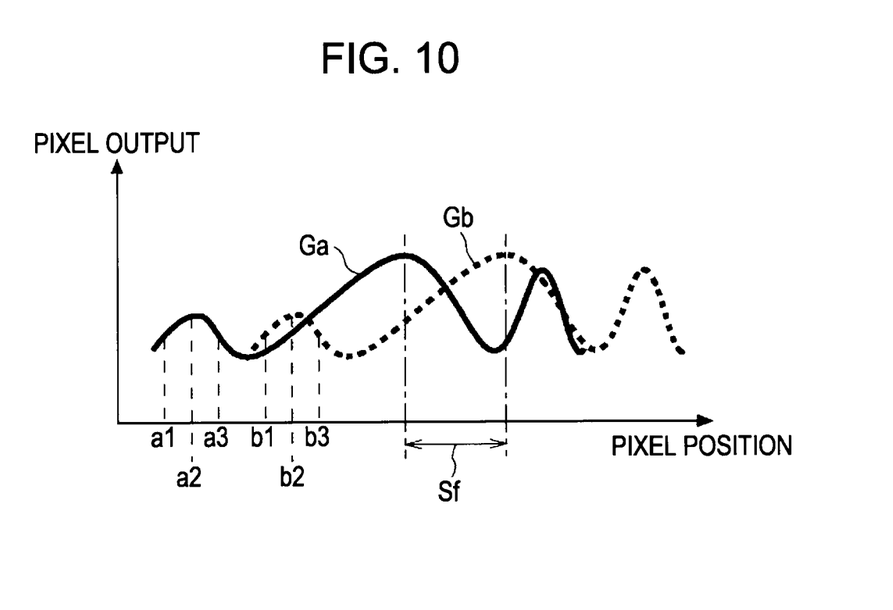
FIG. 10 is a diagram for explaining relationship between a-series pixel outputs and b-series pixel outputs.

By comparison of the graphs Ga and Gb shown in FIG. 10, it is understood that the a-series pixel outputs and the b-series pixel outputs have a phase difference corresponding to an amount of shift Sf in the direction of the AF line Lf (horizontal direction).

Figure 11:
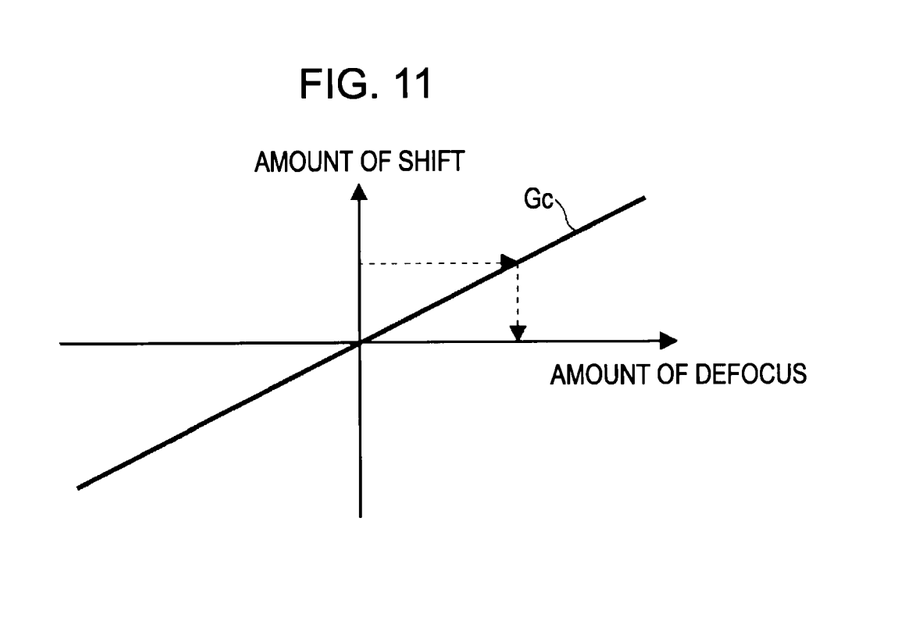
FIG. 11 is a diagram for explaining relationship between an amount of shift and an amount of defocus.

Furthermore, the relationship between the amount of shift Sf mentioned above and the amount of defocus of the focus plane relative to the imaging surface of the imaging element 101 can be expressed by a graph Gc of a linear function shown in FIG. 11. The gradient of the graph Gc can be obtained in advance by testing at a factory or the like.

Thus, after obtaining the amount of shift Sf in the phase-difference AF calculation circuit 77 on the basis of the outputs of the AF lines Lf of the imaging element 101, by calculating the amount of defocus on the basis of the graph Gc shown in FIG. 11, and applying a driving force corresponding to the amount of defocus to the focus lens 211, phase-difference AF can be performed to move the focus lens 211 to an in-focus position.

Also in the case of phase-difference AF performed by using the phase-difference AF module 107, an operation similar to that in the case of the phase-difference AF performed using the imaging element 101 described above is performed. That is, the phase-difference AF module 107 includes a pair of line sensors that receive luminous fluxes from a subject having passed through the right part and the left part (a pair of partial regions) Qa and Qb of the exit pupil of the exchange lens 2, and phase-difference AF is performed on the basis of signals output from the phase-difference AF module (sensor unit) 107.

An AF operation in rapid-fire shooting by the imaging device 1 capable of performing phase-difference AF by using the imaging element 101 (imaging element with a phase-difference detecting function) described above will be described.

AF Operation in Rapid-Rire Shooting

Figure 12:
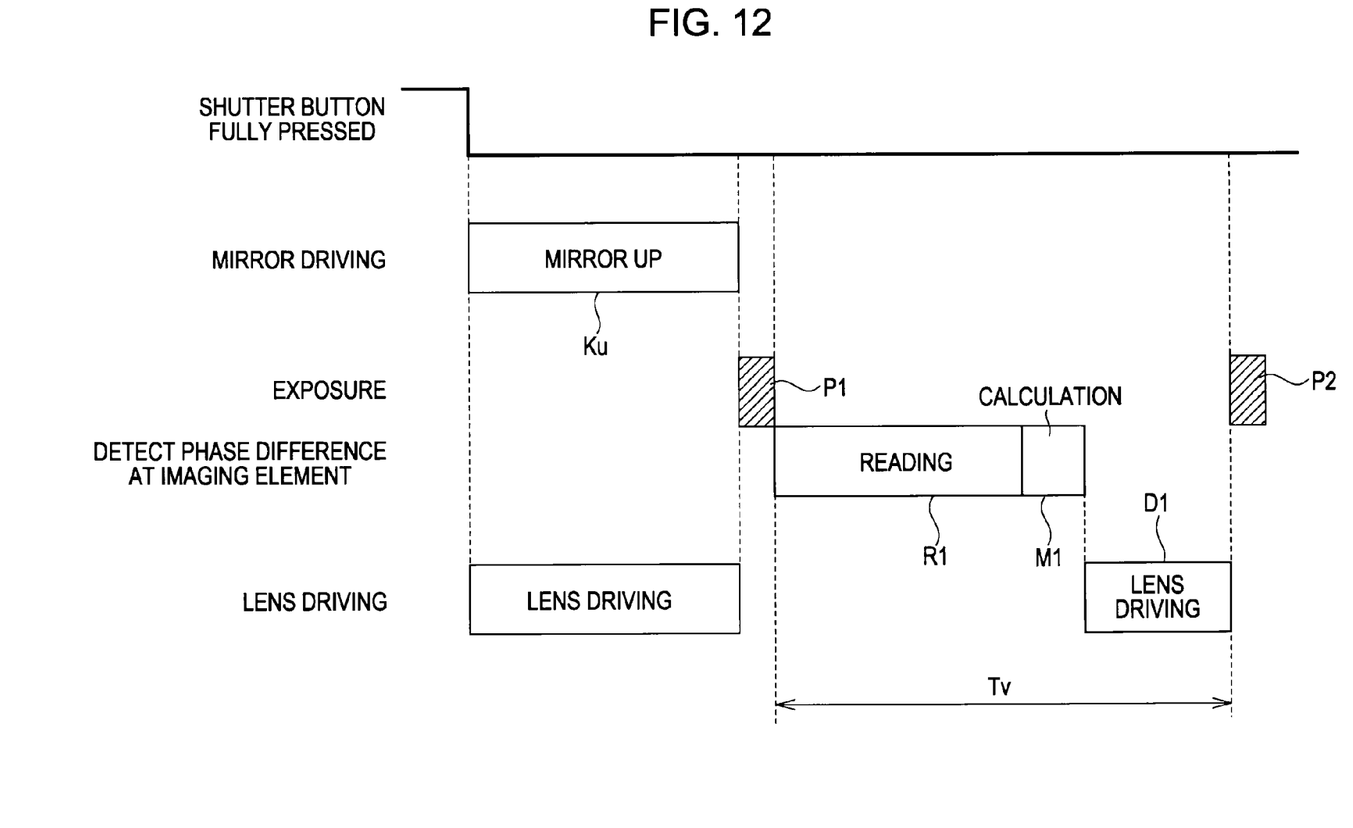
FIG. 12 is a time chart for explaining an AF operation in rapid-fire shooting by the imaging device.

FIG. 12 is a time chart for explaining an AF operation in rapid-fire shooting by the imaging device 1.

In the imaging device 1, rapid-fire shooting, in which the imaging element 101 is exposed successively, is performed when the shutter button 307 is kept full-pressed, as described above. During the rapid-fire shooting, phase-difference AF based on exposure data of the imaging element 101 can be performed. The AF operation at the time of rapid-fire shooting will be described below in detail.

When the shutter button 307 is full-pressed, first, mirror-up driving Ku is performed. Then, the first time of exposure (main exposure) P1 is performed at the imaging element 101 having received light from a subject coming through the exchange lens 2.

Then, reading (reading from all pixels) R1 of charge signals (exposure data) generated at all the pixels (all the effective pixels) of the imaging element 101 by the main exposure P1 is performed. Furthermore, the phase-difference AF calculation circuit 77 performs a calculation process M1 for phase-difference AF on the basis of pixel data of AF lines Lf included in the exposure data.

Then, on the basis of the result of the calculation process M1 for phase-difference AF, i.e., the amount of defocus, lens driving D1 for driving the focus lens 211 to an in-focus position is performed. Then, a main exposure P2 for the second time of shooting is performed with a favorable focus. Also in third and subsequent times of shooting, operations similar to the reading R1 from all the pixels, the calculation process M1 for phase-difference AF, and the lens driving D1 are performed in each interval of main exposures, whereby focus adjustment based on phase-difference AF is performed.

Since the phase-difference AF based on the exposure data of the imaging element 101 generated by main exposure as described above is performed in the interval between the main exposure operations P1 and P2 during rapid-fire shooting, it is possible to shoot pictures with a good focus even if, for example, the subject is a moving object. Furthermore, in the imaging device 1, since it becomes unnecessary to drive the mirror unit 103 (mirror-down driving and mirror-up driving) during rapid-fire shooting, each main exposure operation can be performed within a time interval Tv (FIG. 12) shorter than a time interval Tw (FIG. 15) for rapid-fire shooting in existing art, which involves driving of a mirror unit and so forth. Accordingly, the rate of rapid-fire shooting (frame rate of rapid-fire shooting) can be increased.

Hereinafter, basic operations of the imaging device 1 that performs the AF operation in rapid-fire shooting described above will be described.

Basic Operations of the Imaging Device 1

Figure 13:
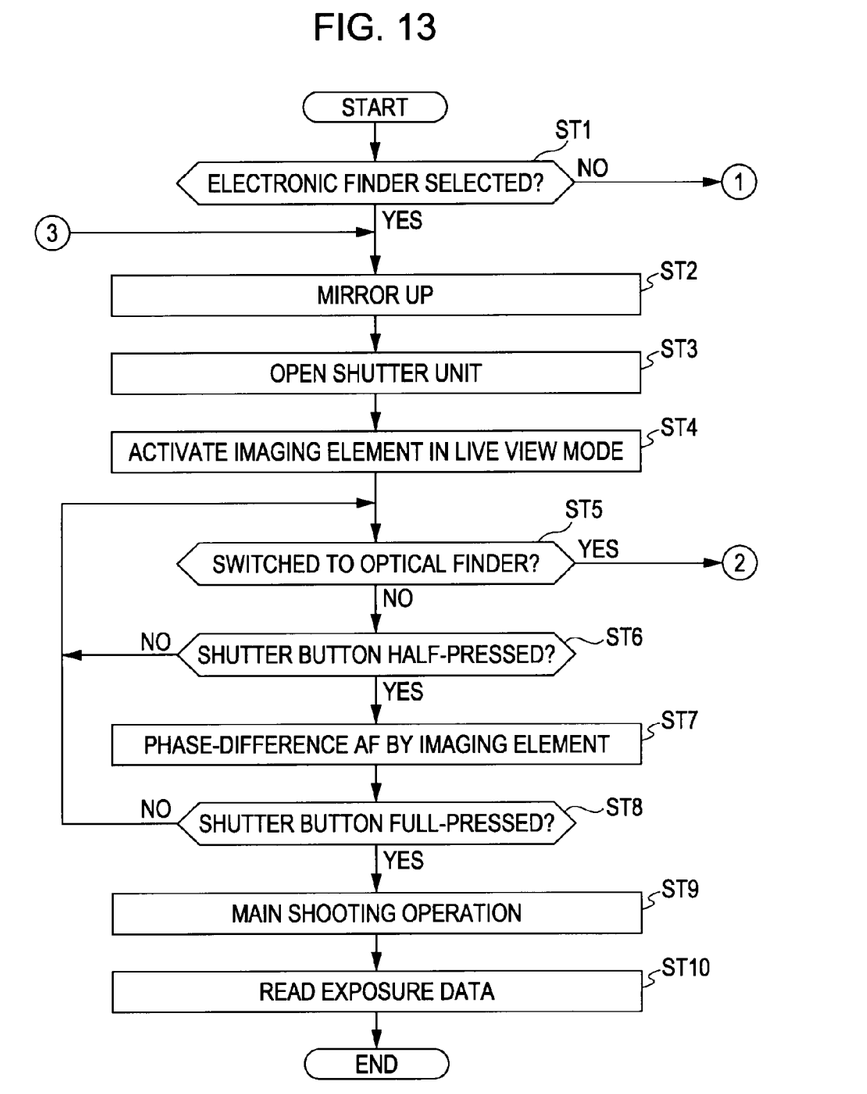
FIG. 13 is a flowchart showing basic operations of the imaging device.
Figure 14:
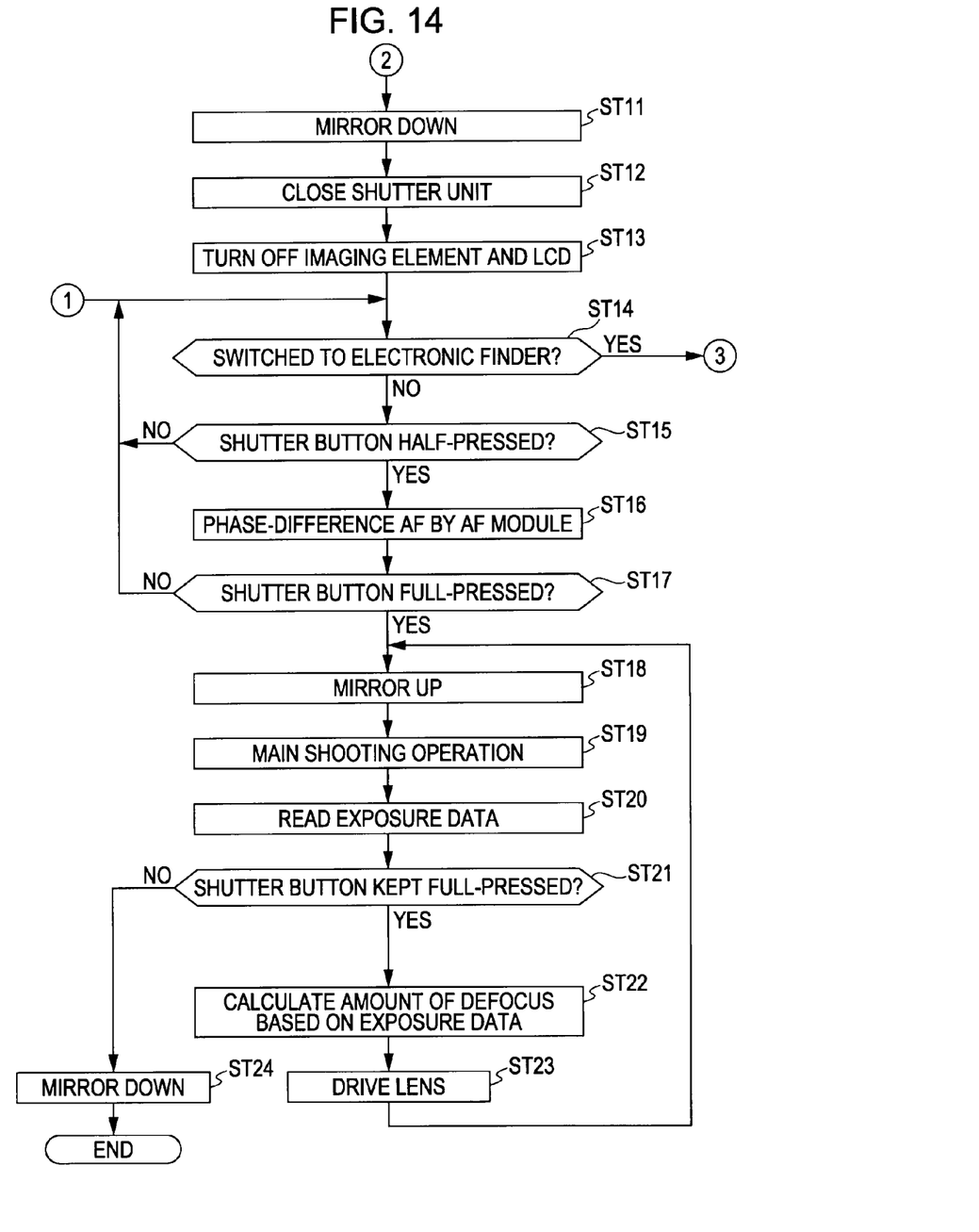
FIG. 14 is a flowchart showing basic operations of the imaging device.

FIGS. 13 and 14 are flowcharts showing basic operations of the imaging device 1. The flowcharts show a series of operations from power on of the imaging device 1 to completion of a single picture shooting or rapid-fire shooting, performed by the main controller 62.

When the main switch 317 is operated by the user to power on the imaging device 1, on the basis of the setting status of the changeover switch 85, it is determined whether the electronic finder (live view mode) is selected (step ST1). If it is determined that the electronic finder is selected, the operation proceeds to step ST2. If the optical finder 316, not the electronic finder, is selected, the operation proceeds to step ST14.

In step ST2, the mirror driving controller 72A drives the mirror driving actuator 72M so that the main mirror 1031 and the submirror 1032 in the mirror unit 103 are moved up (see FIG. 4).

In step ST3, the shutter driving controller 73A drives the shutter driving actuator 73M to open the shutter unit 40.

In step ST4, the imaging element 101 is activated in the live view mode. That is, the imaging element 101 is activated with a reading period of the imaging element 101 set to, for example, 1/60 seconds. Accordingly, live view display on the LCD 311 is started.

In step ST5, it is determined whether switching to the optical finder 316 has been performed. More specifically, it is determined whether the user has operated the changeover switch 85 to select the optical finder 316. If switching to the optical finder 316 has been performed, the operation proceeds to step ST11. If switching has not been performed, the operation proceeds to step ST6.

In step ST6, it is determined whether the shutter button 307 is half-pressed by the user. If the shutter button 307 is half-pressed, the operation proceeds to step ST7. If the shutter button 307 is not half-pressed, the operation returns to step ST5.

In step ST7, phase-difference AF is performed by using the imaging element 101. More specifically, the amount of defocus is calculated on the basis of exposure data of AF lines Lf, output from the imaging element 101 successively exposed for live view display, and a driving force corresponding to the amount of defocus is applied to the focus lens 211 to perform in-focus control so that the focus lens 211 is moved to an in-focus position.

In step ST8, it is determined whether the shutter button 307 is full-pressed by the user. If the shutter button 307 is full-pressed, the operation proceeds to step ST9. If the shutter button 307 is not full-pressed, the operation returns to step ST5.

In step ST9, a main exposure is performed. That is, a main shooting operation for generating exposure data including shot image data for recording is executed by the imaging element 101.

In step ST10, the exposure data generated by the imaging element 101 through the main exposure in step ST9 is read. The shot image data included in the exposure data can be recorded on the memory card 67 through processing in the AFE 5 and the image processor 61.

In step ST11, the mirror driving controller 72A drives the mirror driving actuator 72M so that the main mirror 1031 and the submirror 1032 in the mirror unit 103 are moved down (see FIG. 3).

In step ST12, the shutter driving controller 73A drives the shutter driving actuator 73M to close the shutter unit 40.

In step ST13, since the optical finder is selected, the imaging element 101 and the LCD 311, used for the electronic finder, are turned off.

In step ST14, it is determined whether switching to the electronic finder has been performed. More specifically, it is determined whether the user has operated the changeover switch 85 to select the electronic finder. If switching to the electronic finder has been performed, the operation returns to step ST2. If switching to the electronic finder has not been performed, the operation proceeds to step ST15.

In step ST15, it is determined whether the shutter button 307 is half-pressed by the user. If the shutter button 307 is half-pressed, the operation proceeds to step ST16. If the shutter button 307 is not half-pressed, the operation returns to step ST14.

In step ST16, the phase-difference AF module 107 performs phase-difference AF.

In step ST17, it is determined whether the shutter button 307 is full-pressed by the user. If the shutter button 307 is full-pressed, the operation proceeds to step ST18. If the shutter button 307 is not full-pressed, the operation returns to step ST14.

In step ST18, the mirror driving controller 72A drives the mirror driving actuator 72M so that the main mirror 1031 and the submirror 1032 in the mirror unit 103 are moved up (see FIG. 4).

In step ST19, a main exposure is performed. By the main exposure, at the time of a single shooting or rapid-fire shooting operation, shot image data (image signals) representing an image of a subject is generated by the array of the normal pixels 110 on the imaging element 101, and exposure data (pixel line signals) for focus detection are generated by the AF lines (focus-detection pixel lines) Lf.

In step ST20, the exposure data generated by the imaging element 101 through the main exposure in step ST19 is read. Thus, in each interval of main exposures during rapid-fire shooting, it is possible to output shot image data (image signals) from the array of the ordinary pixels 110 on the imaging element 101 and to output exposure data (pixel line signals) for focus detection from the AF lines (focus-detection pixel lines) Lf.

In step ST21, it is determined whether the full pressing of the shutter button 307, detected in step ST17, is being continued. That is, it is determined whether a next shooting operation is to be performed for rapid-fire shooting. If the shutter button 307 is kept full-pressed, the operation proceeds to step ST22. If the shutter button 307 has been released from full pressing, the operation proceeds to step ST24.

In step ST22, on the basis of the exposure data read in step ST20, the amount of defocus for the subject being imaged is calculated. More specifically, the amount of defocus is calculated by performing the phase-difference AF described earlier on the basis of the exposure data of the AF lines Lf output from the imaging element 101 in each interval of main exposures for rapid-fire shooting.

In step ST23, in-focus control is performed by driving the focus lens 211 on the basis of the amount of defocus calculated in step ST22. That is, focus adjustment is performed in each interval of main exposures for rapid-fire shooting on the basis of the result of focus detection in step ST22.

In step ST24, similarly to step ST11 described earlier, the mirror driving controller 72A drives the mirror driving actuator 72M so that the main mirror 103 and the submirror 1032 in the mirror unit 103 are moved down.

According to the operation of the imaging device 1 described above, since phase-difference AF is performed on the basis of exposure data generated by the AF lines Lf of the imaging element 101 in each interval of main exposures during rapid-fire shooting, the exposure Pa (FIG. 15) of the phase-difference AF module 107, which is performed in the case of existing rapid-fire shooting techniques, can be omitted, so that rapid-fire shooting at a high rate can be performed. Furthermore, in the imaging device 1, rapid-fire shooting is performed with the mirror unit 103 kept moved up, i.e., while maintaining switching of the optical path by the mirror unit 103 so that light from a subject coming through the exchange lens 2 is guided to the imaging element 101 (the second optical path), the mirror-down driving Kd and the mirror-up driving Ku (FIG. 15), performed in the case of existing rapid-fire shooting techniques, can be omitted, so that the rate of rapid-fire shooting can be increased even further.

In the operation of the imaging device 1, alternatively, steps ST21 to ST24 (FIG. 14) may be performed after step ST10 (FIG. 13). Accordingly, even in a case where rapid-fire shooting is performed in the live view mode (when the electronic finder is used), phase-difference AF can be performed appropriately and rapid-fire shooting can be performed at a high rate.

Modifications

Although the imaging device according to the embodiment described above has functions of an optical finder and an electronic finder so that either one can be selected, alternatively, an imaging device may have only a function of an optical finder. Also in this case, by performing phase-difference AF on the basis of exposure data from the AF pixels 11*f* of the imaging element 101 in the mirror-up state, rapid-fire shooting involving an AF operation can be performed at a high rate.

Although the AF pixels are arranged along the horizontal direction as shown in FIG. 7 in the embodiment described above, alternatively, AF pixels may be arranged along the vertical direction. In this case, phase-difference AF is performed on the basis of an amount of shift in the vertical direction regarding a pair of image lines (an a-series image line and a b-series image line) acquired by the AF pixels.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging device having a shooting optical system, the imaging device comprising:
    an imaging element having a pixel array configured to generate image signals regarding light from a subject coming through the shooting optical system, and a plurality of focus-detection pixel lines each having a plurality of pairs of pixels arrayed along a horizontal direction spanning an entire width of the imaging element and a plurality of pairs of shield plates interposed between each of the plurality of pairs of pixels, the pixels of each of the pairs receiving luminous fluxes from the subject coming through a pair of individually corresponding partial regions of an exit pupil of the shooting optical system;
    rapid-fire shooting means for performing rapid-fire shooting by successively exposing the imaging element to generate the image signals at the pixel array on occasion of each exposure and to generate certain signals at each of the plurality of focus-detection pixel lines;
    focus detection means for performing focus detection by a phase-difference detection method on the basis of the certain signals generated by the exposure; and
    focus adjustment means for performing focus adjustment during each interval of the exposures on the basis of a result of detection by the focus detection means.

2. The imaging device according to claim 1, further comprising:
    means for performing focus detection by the phase-difference detection method on the basis of signals output from a sensor unit having a pair of line sensors that receive luminous fluxes from the subject coming through a pair of individually corresponding partial regions of the exit pupil of the shooting optical system; and
    optical-path switching means for performing switching between a first optical path through which the light from the subject is guided to the sensor unit and a second optical path through which the light from the subject is guided to the imaging element,
    wherein the rapid-fire shooting means includes means for performing the rapid-fire shooting while maintaining switching to the second optical path by the optical-path switching means.

3. The imaging device according to claim 1, wherein
    the pixel array configured to generate image signals includes a plurality of pixel array lines horizontally spanning the entire width of the imaging element, and
    one of the plurality of focus-detection pixel lines is provided for each set of six pixel array lines.

4. The imaging device according to claim 1, wherein
    each of the plurality of pairs of pixels of the plurality of focus-detection pixel lines span an intersection between pixels of the pixel array.

5. The imaging device according to claim 1, wherein
    each of the plurality of pairs of shield plates span an intersection between pixels of the pixel array.

6. An imaging device having a shooting optical system, the imaging device comprising:
    an imaging element having a pixel array configured to generate image signals regarding light from a subject coming through the shooting optical system, and a plurality of focus-detection pixel lines each having a plurality of pairs of pixels arrayed along a horizontal direction spanning an entire width of the imaging element and a plurality of pairs of shield plates interposed between each of the plurality of pairs of pixels, the pixels of each of the pairs receiving luminous fluxes from the subject coming through a pair of individually corresponding partial regions of an exit pupil of the shooting optical system;
    a rapid-fire shooting unit configured to perform rapid-fire shooting by successively exposing the imaging element to generate the image signals at the pixel array on occasion of each exposure and to generate certain signals at each of the plurality of focus-detection pixel lines;
    a focus detection unit configured to perform focus detection by a phase-difference detection method on the basis of the certain signals generated by the exposure; and
    a focus adjustment unit configured to perform focus adjustment during each interval of the exposures on the basis of a result of detection by the focus detection unit.

7. The imaging device according to claim 6, wherein
    the pixel array configured to generate image signals includes a plurality of pixel array lines horizontally spanning the entire width of the imaging element, and
    one of the plurality of focus-detection pixel lines is provided for each set of six pixel array lines.

8. The imaging device according to claim 6, wherein
    each of the plurality of pairs of pixels of the plurality of focus-detection pixel lines span an intersection between pixels of the pixel array.

9. The imaging device according to claim 8, wherein
    each of the plurality of pairs of shield plates span an intersection between pixels of the pixel array.

* * * * *